(12) United States Patent
Lu et al.

(10) Patent No.: US 8,436,107 B2
(45) Date of Patent: May 7, 2013

(54) TWO-COMPONENT HIGH GLOSS SEMI-PERMANENT WATER BASED RELEASE AGENT FOR POLYESTER SUBSTRATES

(75) Inventors: Zheng Lu, Glastonbury, CT (US); Joseph Schulz, Newington, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 12/728,519

(22) Filed: Mar. 22, 2010

(65) Prior Publication Data

US 2010/0173069 A1 Jul. 8, 2010

Related U.S. Application Data

(63) Continuation of application No. PCT/US2008/011234, filed on Sep. 26, 2008.

(60) Provisional application No. 60/975,556, filed on Sep. 27, 2007.

(51) Int. Cl.
*C08L 83/04* (2006.01)
*C08G 77/04* (2006.01)
*C08G 77/06* (2006.01)

(52) U.S. Cl.
USPC .............. 525/477; 525/478; 524/588; 528/18

(58) Field of Classification Search .................. None
See application file for complete search history.

(56) References Cited

U.S. PATENT DOCUMENTS

| | | | | |
|---|---|---|---|---|
| 2,985,545 A * | 5/1961 | Leavitt | 428/447 |
| 2,985,546 A * | 5/1961 | Leavitt | 428/447 |
| 3,070,566 A * | 12/1962 | Nitzsche et al. | 524/80 |
| 3,159,662 A * | 12/1964 | Ashby | 528/15 |
| 3,304,259 A * | 2/1967 | Wright | 508/208 |
| 3,518,325 A * | 6/1970 | Sprenger et al. | 525/478 |
| 3,628,996 A * | 12/1971 | Weber | 427/387 |
| 3,708,324 A * | 1/1973 | Stebleton | 427/342 |
| 3,919,136 A * | 11/1975 | Smith | 524/732 |
| 4,071,644 A * | 1/1978 | Grenoble | 427/302 |
| 4,098,701 A * | 7/1978 | Burrill et al. | 427/387 |
| 4,100,124 A * | 7/1978 | Ichikawa et al. | 524/730 |
| 4,151,344 A * | 4/1979 | Doss et al. | 528/34 |
| 4,190,688 A * | 2/1980 | Traver et al. | 427/391 |
| 4,558,109 A * | 12/1985 | McAfee | 528/15 |
| 4,624,900 A * | 11/1986 | Fau | 428/447 |
| 4,770,942 A * | 9/1988 | Itoh et al. | 428/447 |
| 4,782,112 A * | 11/1988 | Kondo et al. | 524/837 |
| 4,888,384 A * | 12/1989 | Traver | 524/862 |
| 4,954,539 A * | 9/1990 | Cavezzan et al. | 524/27 |
| 4,954,565 A * | 9/1990 | Liles | 524/860 |
| 4,962,153 A * | 10/1990 | Liles | 524/837 |
| 4,978,710 A * | 12/1990 | Liles | 524/837 |
| 5,001,186 A * | 3/1991 | Liles | 524/588 |
| 5,049,611 A * | 9/1991 | Baney et al. | 524/588 |
| 5,438,095 A * | 8/1995 | Liles et al. | 524/785 |
| 5,449,716 A * | 9/1995 | Liles et al. | 524/837 |
| 5,895,794 A * | 4/1999 | Berg et al. | 523/217 |
| 2004/0235683 A1 | 11/2004 | Moffett | |
| 2006/0009577 A1 | 1/2006 | Hara | |
| 2006/0249882 A1 | 11/2006 | Boinowitz et al. | |
| 2007/0110840 A1 | 5/2007 | Althoff et al. | |

FOREIGN PATENT DOCUMENTS

| | | |
|---|---|---|
| EP | 319982 A2 * | 6/1989 |
| EP | 1 043 363 | 10/2000 |
| EP | 1 215 248 | 6/2002 |
| EP | 1 245 642 | 10/2002 |
| KR | 1019950015136 | 12/1995 |
| WO | WO 2005/063890 | 7/2005 |

OTHER PUBLICATIONS

Gelest, Reactive Silicones: Forging New Polymer Links, 2004, 64 pages.*

* cited by examiner

*Primary Examiner* — Robert S Loewe
(74) *Attorney, Agent, or Firm* — Steven C. Bauman; James E. Piotrowski

(57) ABSTRACT

The present invention relates to mold release agents. More particularly, it relates to a two-component, high gloss, semi permanent water-based mold release agent.

14 Claims, No Drawings

TWO-COMPONENT HIGH GLOSS SEMI-PERMANENT WATER BASED RELEASE AGENT FOR POLYESTER SUBSTRATES

BACKGROUND OF THE INVENTION

1. Field of the Invention

The present invention relates to mold release agents. More particularly, it relates to a two-component, high gloss, semi-permanent water-based mold release agent.

2. Description of Related Technology

Molding is a well known technique for producing finished parts made from plastics, polyester and other polymeric materials. Currently, molded parts range from bicycle helmets to boat hulls to telephone receiver handsets and beyond.

Molding is performed by processing (e.g. pouring, injecting, spraying, etc.) a liquid resin, or a reinforcing material (such as fiber reinforcing material) and a liquid resin, into a mold cavity or onto a mold surface and then curing the resin to provide a finished solid part conforming to the cavity or surface. In order to prevent the finished molded part from sticking to the mold surface, a mold release agent is applied to the surface of the mold prior to pouring the resin.

There are two basic types of an external mold release agent, sacrificial and semi-permanent. A sacrificial mold release agent is one that is consumed or otherwise completely depleted after a single molded part is made in the mold, and must be reapplied prior to making each molded part. For this reason, sacrificial mold release agents are costly and cumbersome to use.

Semi-permanent mold release agents are also applied to the mold surface. They can be of the wipe-on or spray-on type. These release agents are preferred because they are not completely depleted following a single molding operation. A single semi-permanent mold release agent application can be used to facilitate the release of multiple successive molded parts without reapplication of the release agent; e.g. up to 10, 20, 30 or more releases.

Conventionally, room temperature curing semi-permanent mold release agents, e.g. for room temperature molding applications (epoxy-based or polyester-based composites), have been solvent based; that is they contain significant amounts of volatile organic compounds (VOCs), and have relatively low flash points and high vapor pressures. Existing solvent based mold release agents present significant environmental health and safety hazards, both in use and transport. Further, existing release agents incorporate a one-part product, thus limiting the shelf life of the product and reducing the effectiveness over time.

There is a need in the art for a two-part, high gloss, semi-permanent mold release agent, which is desirably water based, and does not suffer from the drawbacks mentioned above.

SUMMARY OF THE INVENTION

In one aspect of the present invention, there is provided a two-part mold release agent including a first part including silanol-terminated polysiloxane and an organohydride cross-linker, and a second part including a catalyst.

In another aspect of the invention there is provided a method of forming a two-part mold release coating, which includes the steps of combining a first part including silanol-terminated polysiloxane and an organohydride cross-linker with a second part including a catalyst, and applying the combination to the surface of a mold, where the coating is substantially high gloss and streak-free.

In another aspect of the invention, there is provided a two-part composition including a reaction product of a first part including a silanol-terminated polysiloxane and an organohydride cross-linker, and a second part including a catalyst.

In yet another aspect of the present invention, there is provided a method of making molded articles including the steps of providing a polymer or metal mold, and applying a mold release composition to the surface of said mold, where the composition includes a silanol-terminated polysiloxane, an organohydride cross-linker, and a catalyst.

DETAILED DESCRIPTION OF THE INVENTION

A two-part, high gloss, water based mold release agent is provided. Desirably, the mold release agent includes two separate components, which may be mixed together. In one embodiment, the first part of the mold release agent may include a silanol-terminated polysiloxane and an organohydride cross-linker. The second part of the mold release agent may include a catalyst.

As used herein, the "gloss value" of a molded article is defined as the ratio of the light reflected off the surface of the article to the incident light. Theoretically, the range of the gloss scale for non-metal articles is from 0 to 100, with 100 being the glossiest surface and 0 being the least glossy surface. Gloss value can be measured by using a traditional reflection or gloss meter, with the reflection angle being either 20°, 45°, 60°, or 85°. A "high gloss" material is one that has a gloss value of at least about 80, as measured with a gloss meter with a reflection angle of 60°.

As used herein, "releasability" refers to the relative ease of releasing a molded article from the surface of a mold. A high degree of releasability means that the molded article is released easier, while a lower degree of releasability means that the molded article requires force to be released from the mold.

In one embodiment, the first part includes a silanol-terminated polysiloxane. Desirably, the silanol-terminated polysiloxane desirably has the following general structure (I):

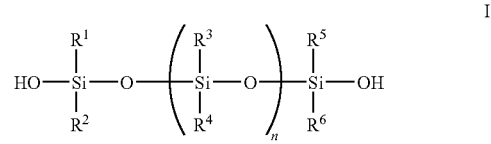

In the above structure, $R^1$, $R^2$, $R^3$, $R^4$, $R^5$ and $R^6$ may be the same or they may be different, and may be independently selected from $C_{1-6}$ alkyl groups, including fluorinated alkyl groups. n is desirably an integer from 1 to about 3,000. In an alternate embodiment, the polymer chain may be interrupted by a hetero atom.

In some embodiments, the silanol-terminated polysiloxane may be formed from hydroxyl terminated polydimethylsiloxane ("PDMS"). The general structure of PDMS is as follows (II):

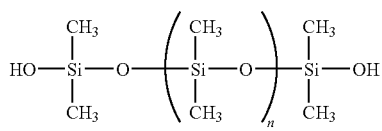

$$\text{II}$$

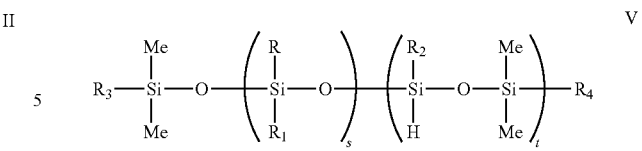

$$\text{V}$$

In the above structure, n is desirably an integer from 1 to about 3,000.

The first part may also include an organohydride cross-linker. Desirably, the organohydride cross-linker includes families of silanes or silicone oligomers, which have hydrogen atoms bonded to silicone. One such example of an organohydride cross-linker of the present invention includes polyorganohydrogen siloxane, which is represented by the following general structure (III):

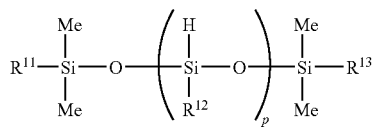

$$\text{III}$$

In the above structure, $R^{11}$ and $R^{13}$ may be the same or they may be different. They may be independently selected from $C_{1-3}$ alkyl groups, silanol groups, alkoxy groups, amino hydrides, as well as other conventionally available unsaturated organo groups. $R^{12}$ is desirably a $C_{1-8}$ saturated alkyl group, including but not limited to fluorinated groups. Desirably, p is an integer from about 3 to about 500.

Another example of a suitable organohydride cross-linker is an alkylhydrogen cyclosiloxane, which is represented by the following general structure (IV):

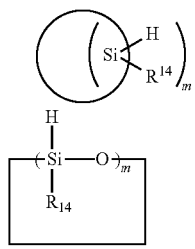

$$\text{IV}$$

In the above structure, $R^{14}$ is desirably a $C_{1-8}$ saturated alkyl group, and m is desirably an integer from about 3 to about 20.

The second part of the two-part mold release agent desirably includes a catalyst. In one embodiment, the part including the catalyst is separate from the silanol-terminated polysiloxane and the organohydride cross-linker. Desirably, the catalyst is any catalyst which may be effective in stimulating the hydride reaction in the first part. In some embodiments, the catalyst may be a water-based catalyst. The catalyst desirably includes tin, zinc compounds, hydroxylamines, or combinations thereof. The concentration of the catalyst may be anywhere from about 0.01% to about 5% depending on the desired speed of the reaction.

Optionally, the mold release agent of the present invention may include a silanol-terminated copolymer. The silanol-terminated copolymer is desirably of the following general structure (V):

In the above structure, R, $R_1$ and $R_2$ may be the same or they may be different from each other, and may be independently selected from $C_{1-8}$ saturated alkyl groups, including fluorinated groups. $R_3$ and $R_4$ may be the same or they may be different from each other, and may be independently selected from $C_{1-3}$ alkyl groups, silanol groups, alkoxy groups, amino groups and hydrides. Desirably, the ratio of s to t is about 100 to 0 to about 10 to 100. In one embodiment, the molecular weight of the copolymer may be between about 1,500 to about 500,000. The copolymer may optionally be included in the first part of the two-part mold release agent. The copolymer may optionally act as the cross-linker.

The mold release agent may optionally include a slip agent to improve the slip of the release agent. Any conventional slip agents may be included. In one embodiment, the slip agent is of the following structure (VI):

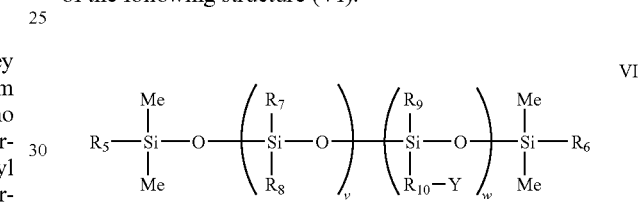

$$\text{VI}$$

In the above structure, $R_5$ and $R_6$ may be the same or they may be different, and may be independently selected from $C_{1-4}$ alkyl groups, $C_{1-4}$ alkoxyl groups, silanol groups, hydrides, carbinol groups, acryloxy groups, acetoxy groups, aminopropyl groups and amino groups. $R_7$, $R_8$, $R_9$, and $R_{10}$ may be the same or they may be different, and may independently be selected from $C_{1-6}$ alkyl groups. Y is desirably selected from amino groups or hydrogen. w may be any integer from 1 to about 200, and v may be any integer from 1 to about 50,000.

The mold release agents described herein may optionally include a surfactant. The surfactant may be any traditional surfactant, including any anionic surfactant, cationic surfactant, or non-ionic surfactant.

The mold release agent may optionally be provided with other components to achieve desired physical and/or chemical characteristics, which components could be selected by a person having ordinary skill in the art without undue experimentation based on the particular characteristic desired. Such optional components may include emulsifiers, wetting agents, solubilizers, organic or inorganic acids or bases to regulate pH, other silicones or siloxanes, and the like. Optionally, the mold release composition may include silica to improve the coating durability and allow for higher multiple release numbers. The mold release agents may optionally contain co-solvents, such as ethylene glycol, propylene glycol, or butanol. The compositions may optionally contain other desired active components known to those of skill in the art.

In one embodiment the mold release agent may include a combination of a silanol-terminated polysiloxane, an organohydride cross-linker, and a catalyst. In an alternative embodiment, the mold release agent includes a silanol-terminated copolymer and a catalyst. In another alternate embodiment, the mold release agent may include a silanol-terminated polysiloxane, a silanol-terminated copolymer, and a catalyst. In yet another embodiment, the mold release agent may include a silanol-terminated polysiloxane, an organohydride cross-linker, a silanol-terminated copolymer, and a catalyst.

A method of forming the two-part mold release coating is provided herein. In one embodiment, the coating is formed by first combining a first part with a second part. The first part desirably includes a silanol-terminated polysiloxane and an organohydride cross-linker, and the second part desirably includes a catalyst. Once the parts are combined, the combination may then be applied to the surface of a mold. Any means to apply the combination to the mold surface may be used. Suitable means for application include wiping, spraying, and the like. As set forth above, the mold release composition may include other additives or components, such as a slip agent, surfactant, or silanol-terminated copolymer, or other components described above. Desirably, the mold is a polymer or metal mold, and most desirably is a polyester mold. In some cases, if long shelf life is not the concern for the formulation, the two component formulation may be combined into one and stored. The combined formulation will have substantially the same release performance as the two-part formulation, but will have a shorter shelf life.

The mold release agent may be applied to the surface of the mold at any suitable temperature. Desirably, the release agent is applied at approximately room temperature. When applied by wiping, the mold release agent may be applied using a soft cloth that has been dampened with the mold release agent. The mold surface is then wiped uniformly to provide a coat of the mold release agent. Following a waiting period to allow the agent to settle, which may be from about 5 to about 60 minutes, a second coat may optionally be applied with the cloth as before. Again, following a waiting period, the process may optionally be repeated. About 2 to about 10 coats, and most desirably between about 3 to about 6 coats of mold release agent are applied to the mold surface. Occasionally, for wipe-on applications, light buffing and light polishing (known as "light wipe-off") may be applied to remove excess mold release agent from the mold surface, or to remove any light streaking or light hazing on the mold surface. In another aspect, the application may be achieved by spraying the agent to the mold surface. Desirably, in a spray-on application, there is little or no need for buffing or polishing of the surface of the mold.

The mold release agent provides effective release of molded articles while maintaining high gloss for both the mold surface and the molded parts. Desirably, after one application of mold release agent, there are at least 10 releases of molded articles without loss of gloss value or releasability. More desirably, there are at least 20-50 releases without substantial loss of gloss value or releasability. After a number of desired releases, a touch up coat of the mold release agent may be applied if release performance or gloss value is diminished. For a touch up coat, desirably only one coat of the mold release agent is applied as described above. However, any number of coats may be applied for the touch-up coat. The interval and number of coats for touch-up coats may be determined by the particular mold and article formed to provide continued effective mold release and high gloss.

Desirably the composition is applied to the surface of the mold in such manner that the application does not leave any streaking or visible residue. The composition is substantially high gloss, and free of hazing or streaking.

The mold release agent of the present invention may optionally be a reaction product of the two parts. The first part desirably includes a silanol-terminated polysiloxane and an organohydride cross-linker, and the second part desirably includes a catalyst. The two parts may be combined together and allowed to react, the mold release agent resulting as the reaction product of the combination. As set forth above, the mold release agent may include other additives, such as slip agents, surfactants, or silanol-terminated copolymers or other components described above.

A method of making molded articles is provided herein. In one embodiment, the method includes first providing a mold. Desirably, the mold is a polymer or is metal, and most desirably is a polyester-based mold. The mold release composition is then applied to the surface of the mold, by any means desired. As above, the composition may be applied via, for example, wiping or spraying onto the surface of the mold. The composition desirably includes a silanol-terminated polysiloxane, an organohydride cross-linker, and a catalyst. As above, the composition may include other additives, including slip agents, surfactants, or silanol-terminated copolymers, or other components described above.

Desirably, the mold release agent described herein has no flash point and is not flammable or combustible. The mold release agent may optionally be devoid or substantially devoid of volatile organic compounds. The mold release agent herein does not present any significant health or safety hazards, either in use or in transport.

The mold release agents described herein desirably have a shelf life of at least about 12 months when maintained as separate parts. When combined, the shelf life of the mixed composition may be as long as several days to several months depending on the quantity of the catalyst added and the storage conditions in which the composition is kept.

EXAMPLES

Example 1

An emulsion was prepared including silanol terminated polydimethylsiloxane of molecular weight ranging from 1500 to 100,000 and polymethyl hydrogensiloxane of molecular weight ranging from 1500 to 10,000 in the present of anionic and non-ionic surfactants. A second emulsion of glycol modified silica was prepared separately. The two emulsions were added together and diluted and referred to as Formulation Part I. The composition of Formulation Part I is set forth in Table 1 below:

TABLE 1

Formulation Part I

| COMPONENT | RANGE |
| --- | --- |
| Silanol terminated PDMS | 0.1-0.6 |
| Methylhydrogen siloxane | 0.03-0.1 |
| Surfactant | 0.02-0.1 |
| Water | 90-99.7 |
| Modified Silica | 0-0.02 |

Formulation Part II was prepared as an emulsion of tin catalyst. Formulation Parts I and II were then combined in equal amounts at room temperature.

The mixture was sprayed onto the surface of a polyester mold. A substantially uniform and high gloss coating was formed. After the composition was cured for 30 minutes at ambient temperature, the release application testing began. High gloss retention and releasability of the polyester parts was observed as listed in Table 2 below. The gloss retention was measured by a 60 degree gloss meter.

Releasability is measured on a 5 point scale, where a value of 5 means there is an automatic release, the article releases with little or no effort; a value of 4 means there is release easily after a light tap of the mold; a value of 3 means that there is a release after a hard slam of the mold; a value of 2 means that there is a release after a bending or twisting of the mold, or forcibly removing the article from the mold; and a value of 1 means that there is no release without causing damage to the mold. A "+" or "−" indicates a smaller distinction in releasability (i.e., 4+ has a slightly easier release than 4, while 4− has a more difficult release than 4).

TABLE 2

Release Data

| Release # | Mold Gloss Value Before Application | Mold Gloss After Application | Releasability | Gloss of Released Part | Mold Gloss After Release |
|---|---|---|---|---|---|
| 1 | 94 | 83 | 4+ | 88 | 86 |
| 2 | 86 | N/A | 5 | 89 | 87 |
| 3 | 87 | N/A | 4+ | 86 | 86 |
| 4 | 86 | N/A | 4+ | 86 | 86 |
| 5 | 86 | N/A | 4+ | 85 | 86 |
| 6 | 86 | N/A | 4+ | 88 | 86 |
| 7 | 86 | N/A | 4 | 86 | 83 |
| 8 | 83 | N/A | 4+ | 89 | 85 |
| 9 | 85 | N/A | 4+ | 86 | 84 |
| 10 | 84 | N/A | 4+ | 88 | 85 |

As can be seen, the gloss retention on the mold surface is consistent throughout the multiple release cycles without noticeable changes and is retained higher than 80. As can be seen, more than 10 effective part releases can be obtained without substantial loss of gloss value or less releasability.

Example 2

An emulsion was prepared including silanol terminated polydimethylsiloxane of molecular weight ranging from 1500 to 100,000 and polymethyl hydrogensiloxane of molecular weight ranging from 1500 to 10,000 in the presence of anionic and non-ionic surfactants. A second emulsion was prepared including dimethylsiloxane methylhydrogen siloxane copolymer of molecular weight ranging from 5500 to 50,000 in the presence of anionic and non-ionic surfactants. The two emulsions were then combined at room temperature. A limited quantity of organic co-solvent was added to the mixture of the two emulsions. The mixture was then diluted with water and referred to as Formulation Part I. The composition of Formulation Part I is set forth in Table 3 below:

TABLE 3

Formulation Part I

| COMPONENT | RANGE |
|---|---|
| Silanol terminated PDMS | 0.1-0.6 |
| Methylhydrogen siloxane | 0.03-0.1 |
| Dimethylsiloxane methylhydrogen siloxane copolymer | 0.05-0.2 |
| Surfactant(s) | 0.02-0.1 |
| Water | 90-99.7 |
| Organic co-solvent | 0.1-5 |

Formulation Part II contains an emulsion of tin catalyst. Formulation Parts I and II were then mixed together in equal amounts at room temperature.

The mixed formulation was then sprayed on to the mold surface. The coating was allowed to cure for 30 minutes at ambient temperature, at which time the release testing was conducted. High gloss retention and releasability of the polyester parts was observed as listed in Table 4 below. The gloss retention was measured by a 60 degree gloss meter. Releasability is measured as explained in Example 1.

TABLE 4

Release Data

| Release # | Mold Gloss Before Application | Mold Gloss After Application | Releasability* | Gloss of Released Part | Mold Gloss After Release |
|---|---|---|---|---|---|
| 1 | 94 | 83 | 4+ | 83 | 86 |
| 2 | 86 | N/A | 5 | 88 | 85 |
| 3 | 85 | N/A | 4+ | 88 | 88 |
| 4 | 88 | N/A | 5 | 84 | 86 |
| 5 | 86 | N/A | 4+ | 84 | 84 |
| 6 | 84 | N/A | 5 | 88 | 85 |
| 7 | 85 | N/A | 4+ | 86 | 85 |
| 8 | 85 | N/A | 4+ | 88 | 85 |
| 9 | 85 | N/A | 4+ | 86 | 84 |
| 10 | 84 | N/A | 4+ | 89 | 85 |

Again, the gloss retention on the mold surface is consistent throughout the multiple release cycles without noticeable decreasing and is retained higher than 80. As can be seen, more than 10 effective polyester part releases can be obtained without substantial loss in gloss value or releasability.

Example 3

An emulsion was prepared including silanol terminated polydimethylsiloxane of molecular weight ranging from 1500 to 100,000 and polymethyl hydrogensiloxane of molecular weight ranging from 1500 to 10,000 in the present of anionic and non-ionic surfactants. A second emulsion of glycol modified silica was prepared. A third emulsion of silanol-terminated dimethylsiloxane methylpropylamino siloxane copolymer was also prepared. The three emulsions were mixed together at room temperature and diluted with water. The resulting mixture was referred to as Formulation Part I. The composition of Formulation Part I is set forth in Table 5 below:

TABLE 5

Formulation Part I

| COMPONENT | RANGE |
|---|---|
| Silanol terminated PDMS | 0.1-1.0 |
| Methylhydrogen siloxane | 0.03-0.2 |
| Silanol terminated dimethylsiloxane methylpropylamino siloxane copolymer | 0-0.3 |
| Surfactant | 0.02-0.2 |
| Water | 90-99.5 |
| Modified Silica | 0-0.05 |

Formulation Part II contains an emulsion of tin catalyst. Formulation Parts I and II were then mixed together in equal amounts at room temperature.

The mixture was wiped on to the surface of a polyester mold. Light wipe-off was applied to the wiped-on surface. The application was allowed to cure for 30 minutes at ambient temperature, at which point the release testing commenced. High gloss retention and releasability of the polyester parts was observed as listed in Table 6 below. The gloss retention was measured by a 60 degree gloss meter. Releasability is measured as explained in Example 1.

TABLE 6

Release Data

| Release # | Mold Gloss Before Application | Mold Gloss After Application | Releasability* | Gloss of Released Part | Mold Gloss After Release |
|---|---|---|---|---|---|
| 1 | 94 | 92 | 5 | 91 | 95 |
| 2 | 95 | N/A | 4+ | 93 | 92 |
| 3 | 92 | N/A | 5 | 92 | 94 |
| 4 | 94 | N/A | 5 | 93 | 93 |
| 5 | 93 | N/A | 4+ | 93 | 92 |
| 6 | 92 | N/A | 4 | 86 | 89 |
| 7 | 89 | N/A | 4 | 90 | 89 |

As can be seen in Table 6, the gloss retention on the mold surface is consistent throughout the multiple release cycles without noticeable changes and is retained mostly higher than 90. Compared with the spray application, the wipe-on method produced higher gloss retention value on the mold surface. The added amino functional group appears to have improved the gloss retention value on the mold.

The invention claimed is:

1. A two-part, water-based mold release agent comprising:
a first part comprising a mixture of a silanol-terminated polysiloxane, an organohydride cross-linker, a surfactant and water;
a second part comprising water and a catalyst selected from the group consisting of tin compounds, zinc compounds and hydroxylamine; and
silica, wherein said organohydride cross-linker is structurally different from the silanol-terminated polysiloxane and comprises the structure:

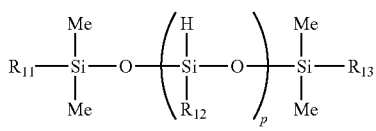

wherein one of $R_{11}$ and $R_{13}$ is a hydroxyl group and the other of $R_{11}$ and $R_{13}$ is independently selected from the group consisting of $C_{1-3}$ alkyl groups, hydroxyl groups, alkoxy groups, amino groups, hydride and unsaturated organo groups;
$R_{12}$ is a $C_{1-8}$ saturated alkyl group; and
p is an integer from about 3 to about 500.

2. The two-part, water-based mold release agent of claim 1, wherein said first part further comprises a copolymer structurally different from the silanol-terminated polysiloxane, the copolymer comprising the structure:

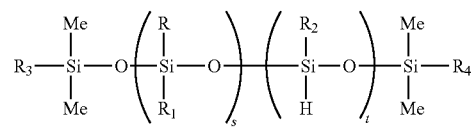

wherein R, $R_1$ and $R_2$ are the same or different, and are independently selected from $C_{1-8}$ saturated alkyl groups;
$R_3$ and $R_4$ are the same or different, and are independently selected from hydroxyl groups and alkoxy groups; and
the ratio of s to t is about 10s to 1t to about 1s to 10t.

3. The two-part, water-based mold release agent of claim 2, wherein said copolymer has a molecular weight from about 1,500 to about 500,000.

4. The two-part, water-based mold release agent of claim 1, further comprising a slip agent structurally different from the silanol-terminated polysiloxane.

5. The two-part, water-based mold release agent of claim 4, wherein said slip agent comprises the structure:

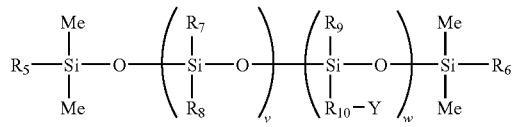

wherein $R_5$ and $R_6$ are the same or different and are independently selected from the group consisting of $C_{1-4}$ alkyl groups, $C_{1-4}$ alkoxyl groups, hydroxyl groups, hydrides, carbinol groups, acryloxy groups, acetoxy groups, aminopropyl groups and amino groups;
$R_7$, $R_8$, $R_9$, and $R_{10}$ are the same or different and are independently selected from the group consisting of $C_{1-6}$ alkyl groups;
Y are selected from the group consisting of amino groups and hydrogen;
v is an integer from 1 to about 50,000; and
w is an integer from 1 to about 200.

6. The two-part, water-based mold release agent of claim 1, wherein said first part further comprises a surfactant, wherein said surfactant is selected from the group consisting of anionic surfactants, cationic surfactants and non-ionic surfactants.

7. The two-part, water-based mold release agent of claim 1, wherein said first part further comprises:
a copolymer structurally different from the silanol-terminated polysiloxane, the copolymer comprising the structure:

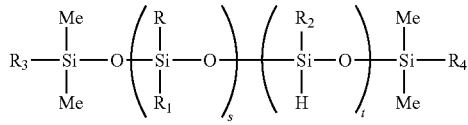

wherein R, $R_1$ and $R_2$ are the same or different, and are independently selected from $C_{1-8}$ saturated alkyl groups;
$R_3$ and $R_4$ are the same or different, and are independently selected from silanol groups and alkoxy groups; and
the ratio of s to t is about 10s to 1t to about 1s to 10t; and
a slip agent structurally different from the silanol-terminated polysiloxane and structurally different from the copolymer.

8. The two-part, water-based mold release agent of claim 1, wherein the silanol-terminated polysiloxane comprises the structure:

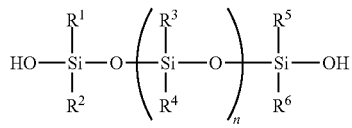

wherein $R^1$, $R^2$, $R^3$, $R^4$, $R^5$ and $R^6$ are each independently selected from $C_{1-6}$ alkyl groups and $C_{1-6}$ fluorinated alkyl groups, n is an integer from 1 to about 3,000.

9. A two-part, water-based mold release agent comprising:
a first part comprising a mixture of a silanol-terminated polysiloxane, an organohydride cross-linker, a surfactant and water;
a second part comprising water and a catalyst selected from the group consisting of tin compounds, zinc compounds and hydroxylamine; and
silica, wherein said organohydride cross-linker is structurally different from the silanol-terminated polysiloxane and comprises the structure:

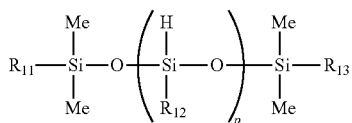

wherein $R_{11}$ and $R_{13}$ are each hydroxyl groups;
$R_{12}$ is a $C_{1-8}$ saturated alkyl group; and
p is an integer from about 3 to about 500.

10. A two-part, water based mold release agent comprising:
a first part comprising an aqueous mixture of:
silanol-terminated polysiloxane having the structure:

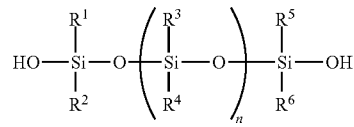

wherein $R^1$, $R^2$, $R^3$, $R^4$, $R^5$ and $R^6$ are each independently selected from $C_{1-6}$ alkyl groups and $C_{1-6}$ fluorinated alkyl groups, n is an integer from 1 to about 3,000;
an organohydride cross-linker is structurally different from the silanol-terminated polysiloxane and has the structure:

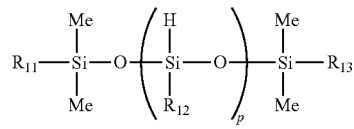

wherein one of $R_{11}$ and $R_{13}$ is a hydroxyl group and the other of $R_{11}$ and $R_{13}$ is independently selected from the group consisting of $C_{1-3}$ alkyl groups, hydroxyl groups, alkoxy groups, amino groups, hydride and unsaturated organo groups,
$R_{12}$ is a $C_{1-8}$ saturated alkyl group,
p is an integer from about 3 to about 50;
surfactant;
water; and
a second part comprising a catalyst.

11. The two-part, water based mold release agent of claim 10, wherein the first part further comprises a copolymer structurally different from the silanol-terminated polysiloxane, the copolymer comprising the structure:

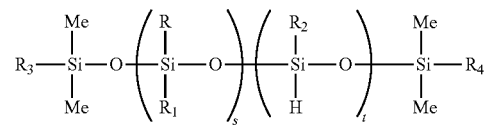

wherein R, $R_1$ and $R_2$ are the same or different, and are independently selected from $C_{1-8}$ saturated alkyl groups,
$R_3$ and $R_4$ are the same or different, and are independently selected from hydroxyl groups and alkoxy groups, and
the ratio of s to t is about 10s to 1t to about 1s to 10t.

12. The two-part, water based mold release agent of claim 10, further comprising a slip agent structurally different from the silanol-terminated polysiloxane.

13. The two-part, water based mold release agent of claim 10, wherein the second part further comprises a surfactant.

14. The two-part, water based mold release agent of claim 10, wherein at least one of the first part or second part further comprises silica.

* * * * *